United States Patent
Baradel et al.

(10) Patent No.: US 10,289,909 B2
(45) Date of Patent: May 14, 2019

(54) CONDITIONAL ADAPTATION NETWORK FOR IMAGE CLASSIFICATION

(71) Applicant: Xerox Corporation, Norwalk, CT (US)

(72) Inventors: Fabien Baradel, Chambery (FR); Boris Chidlovskii, Meylan (FR); Gabriela Csurka, Crolles (FR)

(73) Assignee: Xerox Corporation, Norwalk, CT (US)

( * ) Notice: Subject to any disclaimer, the term of this patent is extended or adjusted under 35 U.S.C. 154(b) by 162 days.

(21) Appl. No.: 15/450,620

(22) Filed: Mar. 6, 2017

(65) Prior Publication Data

US 2018/0253627 A1 Sep. 6, 2018

(51) Int. Cl.
  *G06K 9/00* (2006.01)
  *G06K 9/46* (2006.01)
  *G06K 9/62* (2006.01)

(52) U.S. Cl.
  CPC ....... *G06K 9/00624* (2013.01); *G06K 9/4628* (2013.01); *G06K 9/6262* (2013.01); *G06K 9/6271* (2013.01)

(58) Field of Classification Search
  CPC ...... G06K 9/6267; G06K 9/46; G06K 9/6269; G06N 3/08; G06N 99/005; G06N 3/0454; G06N 3/02; G06T 2207/20081; G06T 2207/20084
  See application file for complete search history.

(56) References Cited

U.S. PATENT DOCUMENTS

2013/0013539 A1* 1/2013 Chenthamarakshan ..................... G06N 99/005 706/12

OTHER PUBLICATIONS

Long, Mingsheng, et al. "Deep transfer learning with joint adaptation networks." arXiv preprint arXiv:1605.06636 (2016).*
Ren, Yong, et al. "Conditional generative moment-matching networks." Advances in Neural Information Processing Systems. 2016.*
Long, Mingsheng, et al. "Learning transferable features with deep adaptation networks." arXiv preprint arXiv:1502.02791 (2015).*
Long, Mingsheng, et al. "Unsupervised domain adaptation with residual transfer networks." Advances in Neural Information Processing Systems. 2016.*

* cited by examiner

*Primary Examiner* — Li Liu (57) ABSTRACT

A method and apparatus for classifying an image. In one example, the method may include receiving one or more images associated with a source domain and one or more images associated with a target domain, identifying one or more source domain features based on the one or more images associated with the source domain, identifying one or more target domain features based on the one or more images associated with the target domain, training a conditional maximum mean discrepancy (CMMD) engine based on a difference between the one or more source domain features and the one or more target domain features, applying the CMMD engine to the one or more images associated with the target domain to generate one or more labels for each unlabeled target image of the one or more images associated with the target domain and classifying each one of the one or more images in the target domain using the one or more labels.

7 Claims, 5 Drawing Sheets

CONDITIONAL ADAPTATION NETWORK FOR IMAGE CLASSIFICATION

The present disclosure relates generally to image processing and, more particularly, to a conditional adaptation network for image classification.

BACKGROUND

Domain adaptation (or transfer learning in a more general case) refers the problem of learning a discriminative model in the presence of the shift between training (source) and test (target) distributions. Multiple shallow transfer learning methods bridge the source and target domains by learning invariant feature representations or estimating the instance importance without using target labels. Recent deep transfer learning methods leverage deep networks to learn more transferable feature representations. They embed domain adaptation in the pipeline of deep learning, which can simultaneously disentangle the explanatory factors of variations behind data and match the marginal distributions across domains.

In domain adaptation, the most challenging is the unsupervised case when labeled instances are not available in the target domain and thus cannot help in reducing the domain shift. This challenge becomes critical when the joint distributions P(X,Y) of features and labels change from one domain to another, which is a natural scenario in practical applications. A recent work gives a new approach to correcting the domain shift based on the theory of kernel embedding of marginal distributions. In the unsupervised case, when target labels are unavailable, the adaptation is executed by minimizing the discrepancy between marginal distributions.

Maximum mean discrepancy (MMD) criterion, derived from a two sample test, is the main element of learning deep models for domain adaptation. It characterizes a joint distribution of input data and their labels via kernel mean embedding.

SUMMARY

According to aspects illustrated herein, there are provided a method, non-transitory computer readable medium and apparatus for classifying an image. One disclosed feature of the embodiments is a method that receives one or more images associated with a source domain and one or more images associated with a target domain, identifies one or more source domain features based on the one or more images associated with the source domain, identifies one or more target domain features based on the one or more images associated with the target domain, trains a conditional maximum mean discrepancy (CMMD) engine based on a difference between the one or more source domain features and the one or more target domain features, applies the CMMD engine to the one or more images associated with the target domain to generate one or more labels for each unlabeled target image of the one or more images associated with the target domain and classifies each one of the one or more images in the target domain using the one or more labels.

Another disclosed feature of the embodiments is a non-transitory computer-readable medium having stored thereon a plurality of instructions, the plurality of instructions including instructions which, when executed by a processor, cause the processor to perform operations that receive one or more images associated with a source domain and one or more images associated with a target domain, identify one or more source domain features based on the one or more images associated with the source domain, identify one or more target domain features based on the one or more images associated with the target domain, train a conditional maximum mean discrepancy (CMMD) engine based on a difference between the one or more source domain features and the one or more target domain features, apply the CMMD engine to the one or more images associated with the target domain to generate one or more labels for each unlabeled target image of the one or more images associated with the target domain and classify each one of the one or more images in the target domain using the one or more labels.

Another disclosed feature of the embodiments is an apparatus comprising a processor and a computer-readable medium storing a plurality of instructions which, when executed by the processor, cause the processor to perform operations that receive one or more images associated with a source domain and one or more images associated with a target domain, identify one or more source domain features based on the one or more images associated with the source domain, identify one or more target domain features based on the one or more images associated with the target domain, train a conditional maximum mean discrepancy (CMMD) engine based on a difference between the one or more source domain features and the one or more target domain features, apply the CMMD engine to the one or more images associated with the target domain to generate one or more labels for each unlabeled target image of the one or more images associated with the target domain and classify each one of the one or more images in the target domain using the one or more labels.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a conditional adaptation network for image classification. The present disclosure a new adaptation network, which learns a conditional distribution given some input variables based on a conditional maximum mean discrepancy (CMMD) criterion. The learning may be performed by stochastic gradient descent with the gradient calculated by back-propagation.

Using the conditional distributions, instead of marginal distributions used in past techniques, may have several advantages. For example, using conditional distributions may provide predictive modeling. Compared to a generative model that defines the joint distribution P(X,Y) of input data X and label variable Y, a conditional model P(Y|X) is often more direct without unnecessary assumptions on modeling P(X), and often leads to better performance with fewer training examples. In addition, using condition distributions may provide the ability to build large networks. Conditional distributions may be essential building blocks of a large generative probabilistic model.

The embodiments of the present disclosure may minimize re-deployment costs by avoiding a total image re-annotation at any new installation of a system that uses machine learning for image classification. The present disclosure may minimize costs while preserving contractual performance of the systems. For example, when image classification systems are moved or used for a new installation, a domain shift may take place. The conditional adaptation network of the present disclosure may allow image classification to be accurately performed by the system without a total image re-annotation or training of images to be performed.

Thus, the embodiments of the present disclosure provide a new CMMD criterion, which is advantages over the marginal version MMD and the joint version. The conditional adaptation network (CAN) of the present disclosure can address both the coupled and decoupled architecture for reducing a shift across source and target distributions. The CAN of the present disclosure can be embedded into deep learning models or complete the adaptation task from available source and target image features only.

Figure 1:
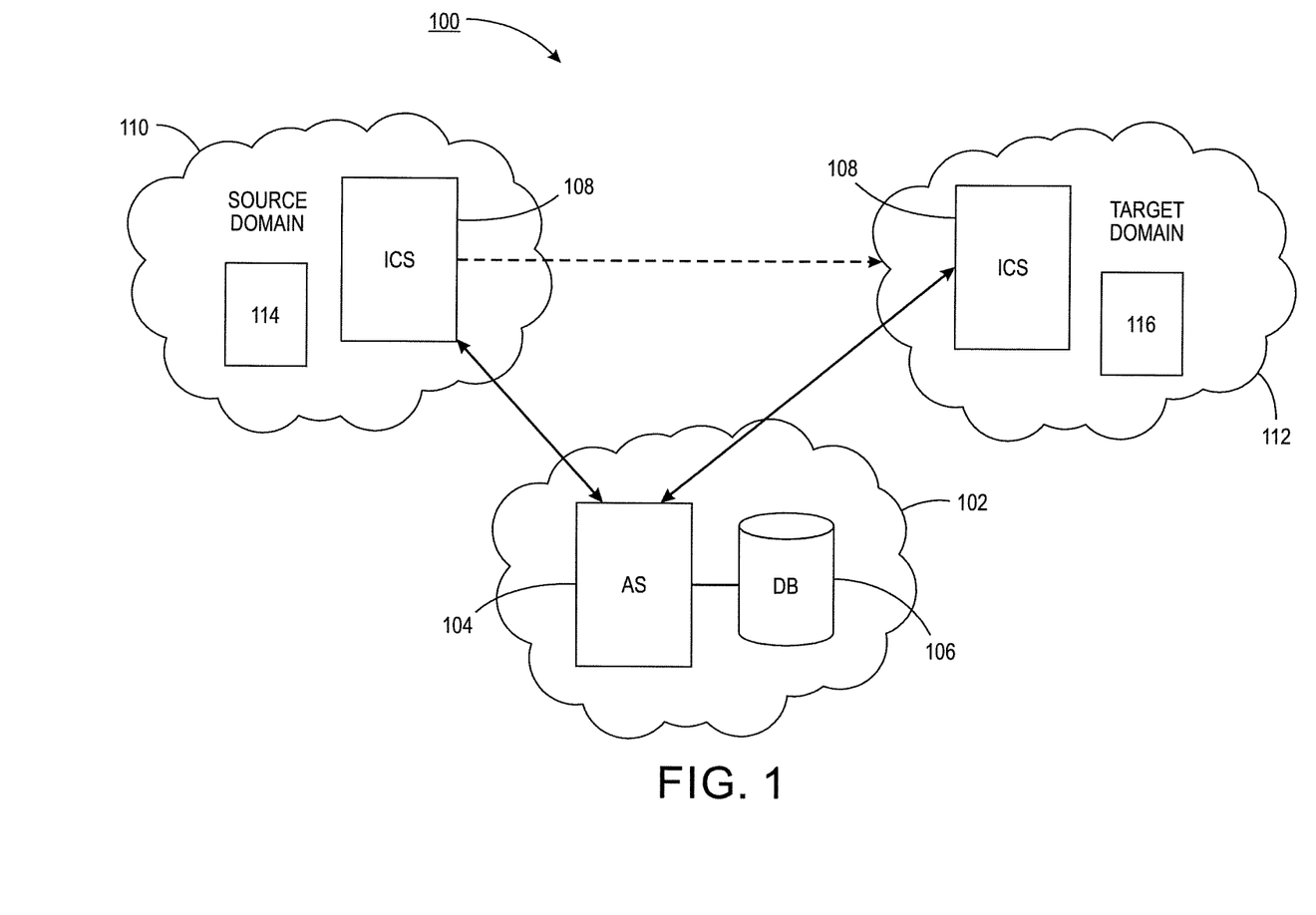
FIG. 1 illustrates an example system of the present disclosure.

FIG. 1 illustrates an example system 100 of the present disclosure. In one example, the system 100 may include a communication network 102. The communication network 102 may be any type of Internet protocol (IP) network. The communication network 102 may be a wide area network (WAN) or a local area network (LAN). The communication network 102 may provide communication over a wired or wireless connection.

The communication network 102 has been simplified for ease of explanation. The communication network 102 may include additional network elements or access networks that are not shown, such as for example, a gateway, a route, a switch, a firewall, a cellular access network, a broadband access network and the like.

In one embodiment, the communications network 102 may include an application server (AS) 104 and a database (DB) 106. The AS 104 may include a processor and computer readable memory. The computer readable memory may store instructions that are executed by the processor to perform the functions described herein.

In one embodiment, the DB 106 may store previously learned features and labels that are learned based off of images in a particular domain, as discussed below. The DB 106 may store images and classifications of the images that can be used for further training and classifying by the AS 104 through an iterative process, as discussed in further detail below.

In one embodiment, system 100 may include a source domain 110 and a target domain 112. In one embodiment, an image classification system (ICS) 108 may be originally trained and deployed in the source domain 110. The ICS 108 may include a video camera that can capture images 114 that may be automatically classified by the ICS 108. The images 114 may include photos or videos in color or black and white. The images 114 may include text.

In one embodiment, the ICS 108 may transmit the images to the AS 104 for processing, as described below. In another embodiment, the AS 104 and DB 106 may be optional and the functions performed by the AS 104 may be performed by a processor of the ICS 108 locally. In addition, the data stored by the DB 106 may be stored locally in a computer readable memory of the ICS 108.

In one embodiment, the ICS 108 may be deployed in the source domain 110 to classify the images 114 as noted above. For example, the ICS 108 may be a system that automatically captures images in a high occupancy vehicle (HOV) lane to determine how many people are in a vehicle. Said another way, the ICS 108 may process an image of a car in the HOV lane to classify how many people are in the vehicle. The ICS 108 may be trained to learn various labels that indicate people, a vehicle, a road, and the like based off of features found in the source domain 110. The labels can be used by the ICS 108 to classify the images 114. It should be noted that the HOV example provided above is one example application of the ICS 108 and the functions descried herein. The methods disclosed herein may be applied to other applications as well.

However, at a later time, the ICS 108 may be re-deployed to the target domain 112. In the past, the ICS 108 would have to be re-trained, which can be expensive and time consuming. Embodiments of the present disclosure avoid the cost and time to retrain the ICS 108 by using the conditional adaptation network (CAN) of the present disclosure.

For example, the AS 104 or the ICS 108 may leverage the labels and features learned from the source domain 110 to create labels based off of features learned in the target domain 112. For example, if the ICS 108 may be used to classify images 116 in the target domain that are similar to the images 114 in the source domain, the labels learned based off of the features in the target domain 112 may be shifted or possess a slight difference than the labels learned based off of the features in the source domain 110.

Figure 2:
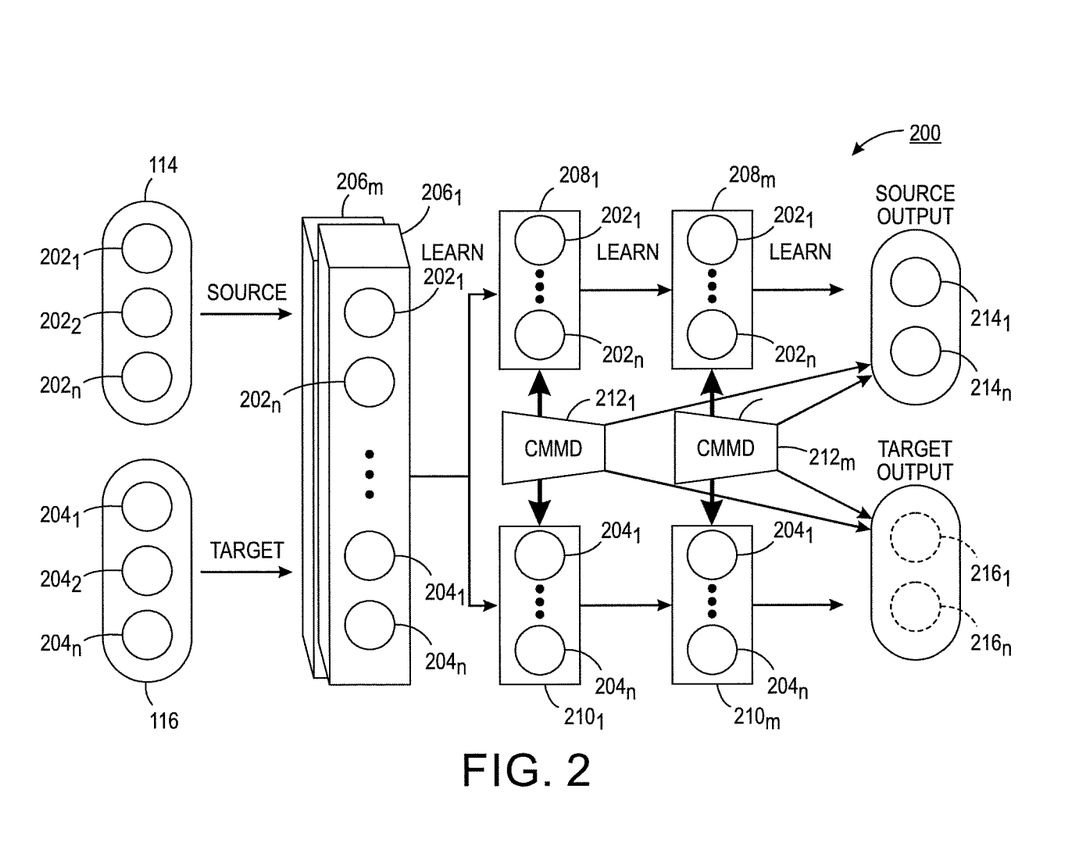
FIG. 2 illustrates an example decoupled conditional adaptation network.

FIG. 2 illustrates an example of a CAN 200 of the present disclosure. In one embodiment, the CAN 200 may be deployed within the ICS 208 if the images are processed locally, or may be deployed by the AS 104 if the images are processed remotely. In one embodiment, the CAN 200 may be a decoupled version as will be explained in further detail below.

The CAN 200 may be used to automatically classify images 116 from the target domain 112 without having to retrain the ICS 108 when redeployed to the target domain 112 from the source domain 110. Rather, the CAN 200 may leverage the training performed in the source domain 110 to identify features in the target domain 112, create labels based off of the features identified in the target domain 112 and classify the images 116 using the new labels in the target domain 112.

In one embodiment, the CAN 200 may receive one or more images 114 from the source domain 110 and one or more images 116 from the target domain 112. The images 114 from the source domain 110 may include one or more source domain features $202_1$ to $202_n$ (hereinafter referred to individually as a source domain feature 202 or collectively as source domain features 202). In one embodiment, features may be high-level features extracted from using a pre-trained deep learning model. For example, for each image the next-to-last layer of the AlexNet or GoogLeNet model can be used as a feature vector. The images 116 from the target domain 112 may include one or more target domain features $204_1$ to $204_n$ (hereinafter referred to individually as a target domain feature 204 or collectively as target domain features 204).

The images 114 and 116 may be fed into one or more deep neural networks $206_1$ to $206_m$ (hereinafter referred to individually as a deep neural network 206 or collectively as deep neural networks 206). In one embodiment, the CAN 200 may use any number of deep neural networks 206 depending on the amount of training or learning that is desired at a cost of efficiency. For example, each additional deep neural network may add another layer of specificity moving from general to specific. For example, the higher the number of deep neural networks 206, the more accurately the CAN 200 may be able to classify an image 116 from the target domain 112, but at a cost processing power and efficiency. In contrast, the lower the number of deep neural networks 206, the faster the CAN 200 can classify an image 116 form the target domain, but at a cost of less accuracy.

In one embodiment, the CAN 200 may be used with any existing deep learning models or systems. For example, the deep neural networks 206 may be based on AlexNet, GoogLeNet, and the like.

In one embodiment, the deep neural networks 206 may analyze the images 114 and 116 to identify the source features $202_1$ to $202_n$ and the target features $204_1$ to $204_n$. In one embodiment, the source features 202 may easily identified based on the features that were used to train the ICS 108 in the source domain 110. For example, the source features 202 may be obtained from the DB 106 or memory in the ICS 108 from training and learning in the source domain 110.

In one embodiment, the CAN 200 may be decoupled as noted above. For example, the source features 202 and the target features 204 may be separated. In one embodiment, the source features 202 and the target features 204 may be separated into a plurality of different layers $208_1$ to $208_m$ and $210_1$ to $210_m$ (hereinafter also referred to individually as a layer 208 or a layer 210 or collectively as layers 208 or layers 210). In one embodiment, the number of layers 208 and 210 may be equal to the number of deep neural networks or layers 206 that are used.

In one embodiment, a conditional maximum mean discrepancy (CMMD) engine $212_1$ to $212_m$ (hereinafter also referred to individually as a CMMD engine 212 or collectively as CMMD engines 212) may be associated with each one of the layers 208 of the one or more source features 202 and each one of the layers 210 of the one or more target features 204. In other words, the CAN 200 may include a plurality of CMMD engines 212. A respective one of the CMMD engines 212 may be associated with each pair of a layer 208 of source features 202 and a layer 210 of target features 204.

In one embodiment, the CMMD engine 212 may calculate a shift or a difference between the one or more source features 202 and the one or more target features 204 for each layer 208 and 210. The CMMD engine 212 may then apply the shift or the differences to generate an output of one or more source labels $214_1$ to $214_n$ (hereinafter referred to individually as a source label 214 or collectively as source labels 214) and one or more target labels $216_1$ to $216_n$ (hereinafter referred to individually as a target label 216 or collectively as target labels 216). In one embodiment, labels may be defined as object categories, such as "car," "horse," "cow," and the like in the ImageNet Collection, or "mug," "bottle," "laptop," and the like in the Office Collection.

The source labels 214 may be the same labels that were used to classify the images 114 in the source domain 110 where the ICS 108 was originally trained and deployed. The target labels 216 may be used to classify the images 116 in the target domain 112 where the ICS 108 has been redeployed and not yet trained. For example, the CMMD engines 212 may apply the target labels 216 to the images 116 that are unlabeled. The target labels 216 may label the unlabeled images and then be classified by the CAN 200 deployed in the AS 104 or the ICS 108. In one embodiment, the target labels 216 may be fed back to the CMMD engines 212 and used in an iterative process to improve the CAN 200 over a period of time to more accurately classify the images 116.

The operation of the CMMD engine 212 may be defined using a discussion of three functions 1) Hilbert Kernel Embedding, 2) Kernel Embedding of Conditional Distributions and then 3) the CMMD. In the Hilbert space embedding, distributions may be represented by elements in a reproducing kernel Hilbert space (RKHS). An RKHS F on X with kernel k is a Hilbert space of functions f: $X \rightarrow \mathbb{R}$. Its inner product $<\cdot,\cdot>_F$ satisfies the reproducing property: $<f(\cdot), k(x,\cdot)>_F = f(x)$. Kernel functions may not be restricted on $\mathbb{R}^d$ and can also be defined on graphs, time series and structured objects. The function $\varphi(x):=k(x,\cdot)$ can be viewed as a feature map of $x \in X$. Then a distribution can be embedded by taking expectation on its feature map: $\mu X:=E_X[\varphi(X)]=\int_\Omega \varphi(X)dP(X)$. If $E_X[k(X,X)] \leq \infty$, then the embedding $\mu_X$ is guaranteed to be an element in the RKHS.

Let $X=\{x_i\}$, $i=1, \ldots, N$, and $Y=\{y_j\}$, $j=1, \ldots, M$ be the sample sets from distributions $P_X$ and $P_Y$, respectively. The Maximum Mean Discrepancy (MMD), developed as the kernel two sample test may be an estimator to answer the query whether $P_X=P_Y$ based on the observed samples. The basic idea behind MMD is that if the generating distributions are identical, all the statistics are the same. Formally, MMD defines the following difference measure:

$$\text{MMD}[K,P_X,P_Y]:=\sup_{f\in K}(E_X[f(X)]-E_Y[f(Y)]),$$

where K is a class of functions. The class of functions in an universal RKHS F is rich enough to distinguish any two distributions and MMD can be expressed as the difference of their mean embeddings. When the mean embedding $\mu_p, \mu_q \in F$, then the MMD objective function can be expressed as its difference, $\text{MMD}[K,p,q]=\|\mu_p-\mu_q\|^2_F$. Moreover, MMD$[K,p,q]=0$ if and only if $p=q$.

In practice, an estimate of the MMD objective compares the square difference between the empirical kernel mean embeddings as shown by the equation below:

$$L^2_{MMD} = \left\| \frac{1}{N}\sum_i^N \varphi(x_i) - \frac{1}{M}\sum_i^M \varphi(y_i) \right\|^2_F,$$

which can be evaluated by expanding the square and using the associated kernel k. In the state of art adaptation networks, the MMD measures the discrepancy between marginal distributions $P(X^s)$ of the source and $P(X^t)$ of the target and get minimized to reduce the distribution shift. For the image and text datasets, Gaussian kernels with bandwidth set have been successfully used.

With respect to the kernel embedding of conditional distributions, the kernel embedding of a conditional distribution $P(Y|X)$ is defined for any $x \in X$ as: $\mu_{Y|x}:=E_{Y|x}[\varphi(Y)]$. The embedding of a conditional distribution is not a single element in RKHS, but sweeps out a family of points in the RKHS, each indexed by a fixed value of x. Formally, the embedding of a conditional distribution is represented as an operator $C_{Y|X}$, which satisfies two following properties $\mu_{Y|x}=C_{Y|X}\varphi(x)$ and $E_{Y|x}[g(Y)|x]=<g,\mu_{Y|x}>_G$, where G is the RKHS corresponding to Y. Such an operator may exist under some assumptions, e.g., using the technique of cross-covariance operator $C_{XY}: G \rightarrow F$, $C_{XY}:=E_{XY}[\varphi(X) \otimes \varphi(Y)]-\mu_X \otimes \mu_Y$, where ⊗ is the tensor product. Operator $C_{XY}$ can be viewed as an element in the tensor product space G⊗F. Assuming that $E_{Y|X}[g(Y)|X]\in F$, then the embedding of conditional distributions $C_{Y|X}$ defined as $C_{Y|X}:=C_{YX}C_{XX}^{-1}$ satisfies the two properties above.

Given a dataset $D_{XY}=\{(x_i,y_i)\}$, i=1, ..., N drawn from P(X,Y), we can estimate the conditional embedding operator as $C_{Y|X}=\phi(K+\lambda I)^{-1}\Psi^T$, where $\phi=(\phi(y_1), ..., \phi(y_N))$, $\Psi=(\phi(x_1), ..., \phi(x_N))$, $K=\Psi^T\Psi$ is the Gram matrix for samples from X, and λ is a regularization parameter to avoid overfitting. The estimator is an element in the tensor product space F⊗G and satisfies the two mentioned properties asymptotically.

Given the discussion of the Hilbert kernel Embedding and the Kernel Embedding of Conditional Distributions described above, the CMMD can be properly described. Given two conditional distributions P(Y|X) and P(Z|X), one aim is to test whether they are the same in the sense that for a given x∈X, whether P(Y|x)=P(Z|x) holds or not, and then use this test for reducing the domain shift (e.g., the difference of the shift between the source features 202 and the target features 204).

Using the definition of kernel mean embedding of conditional distributions described above, for a given instance x∈X, the kernel mean embedding can be defined as $\mu_{Y|X}=C_{Y|X}\phi(x)$. As a result, if $C_{Y|X}=C_{Z|X}$, then $\mu_{Y|X}=\mu_{Z|X}$ is also satisfied for every fixed x. This gives a sufficient condition to guarantee that two conditional distributions are the same. The operator, $L_{CMMD}^2=\|C_{Y|X}-C_{Z|X}\|_{F\otimes G}^2$ may be used to measure the difference of two conditional distributions that may be called the CMMD.

In one embodiment, the unsupervised domain adaptation may have a labeled source set $D_{XY}^s=\{(x_i^s, y_i^s)\}$, i=1, ..., N and a target set $D_X^t=\{x_i^t\}$, i=1, ..., M. Similar to MMD, $D_X^t$ may be enriched with the label predictions $\hat{y}^t$ from the adaptation pipeline to get $D_{XY}^t=\{(x_i^t,\hat{y}_i^t)\}$, i=1, ..., M. Then the square difference between the empirical estimates of the conditional embedding operators may be compared using Equation (1) below:

$$L_{CMMD}^2=\|\hat{C}_{Y|X}^t-\hat{C}_{Y|X}^s\|_{F\otimes G}^2, \quad \text{Equation (1):}$$

where the superscripts t and s denote the source and target sample sets, respectively. For a matrix K, we define its regularized version $\tilde{K}=K+\lambda I$. Using the kernel trick, we can develop and compute the difference in Equation (1) in terms of kernel Gram matrices only, as follows in Equation (2) below:

$$L_{CMMD}^2 = \|\Phi_t(K_t+\lambda I)^{-1}\Phi_t^T - \Phi_s(K_s+\lambda I)^{-1}\Psi_s^T\|_{F\otimes G}^2, \quad \text{Equation (2)}$$
$$= Tr(K_t\tilde{K}_t^{-1}L_t\tilde{K}_t^{-1}) + Tr(K_s\tilde{K}_s^{-1}L_s\tilde{K}_s^{-1}) - 2 \cdot Tr(K_{st}\tilde{K}_d^{-1}L_{st}\tilde{K}_s^{-1})$$

where $\Phi_s:=(\phi(y_1^s), ..., \phi(y_N^s))$ and $\Psi_s:=(\phi(x_1^s), ..., \phi(x_N^s))$ are implicitly formed source feature matrices from $D_{XY}^s$ and $\Phi_t$ and $\Psi_t$ are defined similarly for dataset $D_{XY}^t$. $K_t=\Psi_t^T\Psi_t$ and $K_s=\Psi_s^T\Psi_s$ may be the Gram matrices for the source and target input (e.g., the images 114 from the source domain and the images 116 from the target domain 112), while $L_t=\Phi_t^T\Phi_t$ and $L_s=\Phi_s^T\Phi_s$ are the Gram matrices for the source labels 214 and the target labels 216. Finally, $K_{st}=\Psi_s^T\Psi_t$ and $L_{st}=\Phi_t^T\Phi_s$ are the Gram matrices between the corresponding inputs and labels.

In one embodiment, for the conditional mean embedding operator $C_{Y|X}\in F\otimes G$, having the CMMD objective well defined may require some smoothness assumptions, such that $C_{XX}C_{XY}^{-1}$ is a Hilbert-Schmidt operator. In practice, the empirical estimator $\Phi(K+\lambda I)^{-1}\Psi^T$ may be an element in the tensor product space which gives as a well-justified approximation for practical use.

The CMMD objective can be optimized by the gradient descent. For one example implementation, the TensorFlow Open Source Software Library can be used, which can be used in implementing and testing different CAN configurations.

Figure 3:
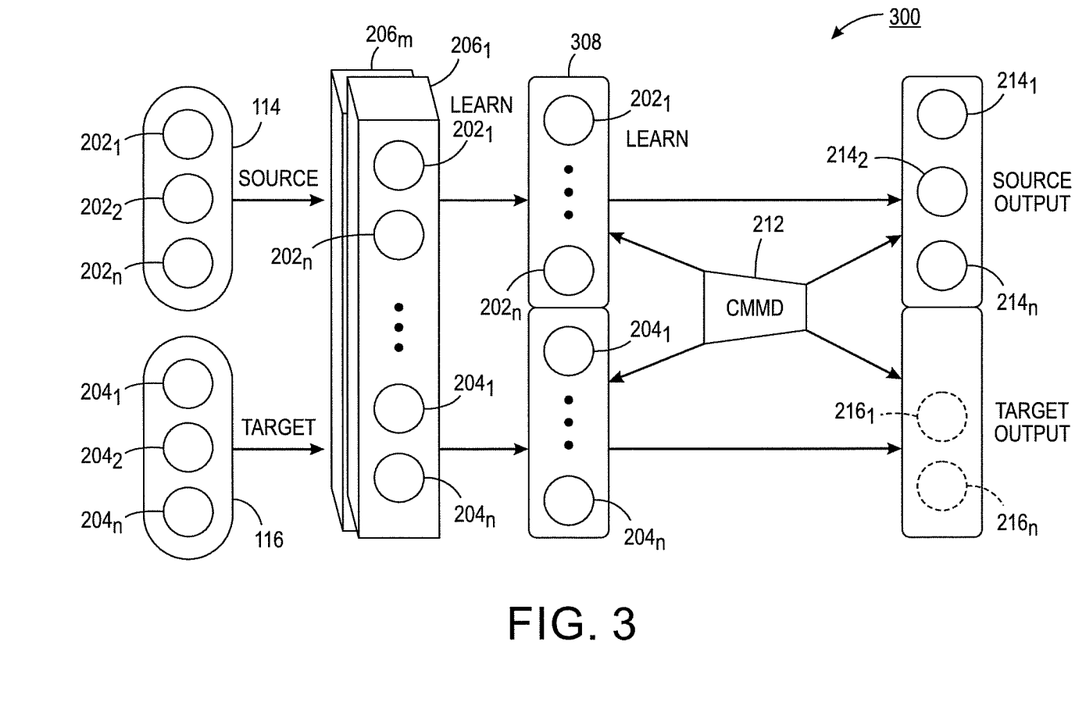
FIG. 3 illustrates an example of a coupled conditional adaptation network.

FIG. 3 illustrates an example of a CAN 300 of the present disclosure. In one embodiment, the CAN 300 may be deployed within the ICS 208 if the images are processed locally, or may be deployed by the AS 104 if the images are processed remotely. In one embodiment, the CAN 300 may be a coupled version as will be explained in further detail below.

The CAN 300 may be used to automatically classify images 116 from the target domain 112 without having to retrain the ICS 108 when redeployed to the target domain 112 from the source domain 110. Rather, the CAN 300 may be used to leverage the training performed in the source domain 110 to identify features in the target domain 112, create labels based off of the features identified in the target domain 112 and classify the images 116 using the new labels in the target domain 112.

In one embodiment, the CAN 300 may receive one or more images 114 from the source domain 110 and one or more images 116 from the target domain 112. The images 114 from the source domain 110 may include one or more source domain features 202. The images 116 from the target domain 112 may include one or more target domain features 204.

The images 114 and 116 may be fed into one or more deep neural networks 206. In one embodiment, the CAN 300 may use any number of deep neural networks 206 depending on the amount of training or learning that is desired at a cost of efficiency. For example, each additional deep neural network may add another layer of specificity moving from general to specific. For example, the higher the number of deep neural networks 206, the more accurately the CAN 300 may be able to classify an image 116 from the target domain 112, but a cost processing power and efficiency. In contrast, the lower the number of deep neural networks 206, the faster then CAN 300 can classify an image 116 form the target domain, but at a cost of less accuracy.

In one embodiment, the CAN 300 may be used with any existing deep learning models or systems. For example, the deep neural networks 206 may be based on AlexNet, GoogLeNet, and the like.

In one embodiment, the deep neural networks 206 may analyze the images 114 and 116 to identify the source features $202_1$ to $202_n$ and the target features $204_1$ to $204_n$. In one embodiment, the source features 202 may easily identified based on the features that were used to train the ICS 108 in the source domain 110. For example, the source features 202 may be obtained from the DB 106 or memory in the ICS 108 from training and learning in the source domain 110.

In one embodiment, the CAN 300 may be coupled as noted above. For example, the source features 202 and the target features 204 may be shared in a shared layer 308. In other words, the respective layers of the one or more source features 202 and the one or more target features 204 may be combined into the shared layer 308 that appears as a single layer. In other words, all of the source features 202 and the target features 204 identified by the deep neural networks $206_1$ to $206_m$ may be combined into the shared layer 308.

In one embodiment, a CMMD engine 212 may process the source features 202 and the target features 204 in the shared layer 308. Similar to the CMMD engines 212 in FIG. 2, the CMMD engine 212 in FIG. 3 may also calculate a shift or a difference between the one or more source features 202 and the one or more target features 204 in the shared layer 308. The CMMD engine 212 may then apply the shift or the differences to generate an output of one or more source labels 214 and one or more target labels 216.

The source labels 214 may be the same labels that were used to classify the images 114 in the source domain 110 where the ICS 108 was originally trained and deployed. The target labels 216 may be used to classify the images 116 in the target domain 112 where the ICS 108 has been redeployed and not yet trained. For example, the CMMD engine 212 may apply the target labels 216 to the images 116 that are unlabeled. The target labels 216 may label the unlabeled images and then be classified by the CAN 300 deployed in the AS 104 or the ICS 108. In one embodiment, the target labels 216 may be fed back to the CMMD engine 212 and used in an iterative process to improve the CAN 300 over a period of time to more accurately classify the images 116. The operation of the CMMD engine 212 in FIG. 3 may be defined using the same equations discussed above with respect to the CMMD engines 212 of FIG. 2.

Figure 4:
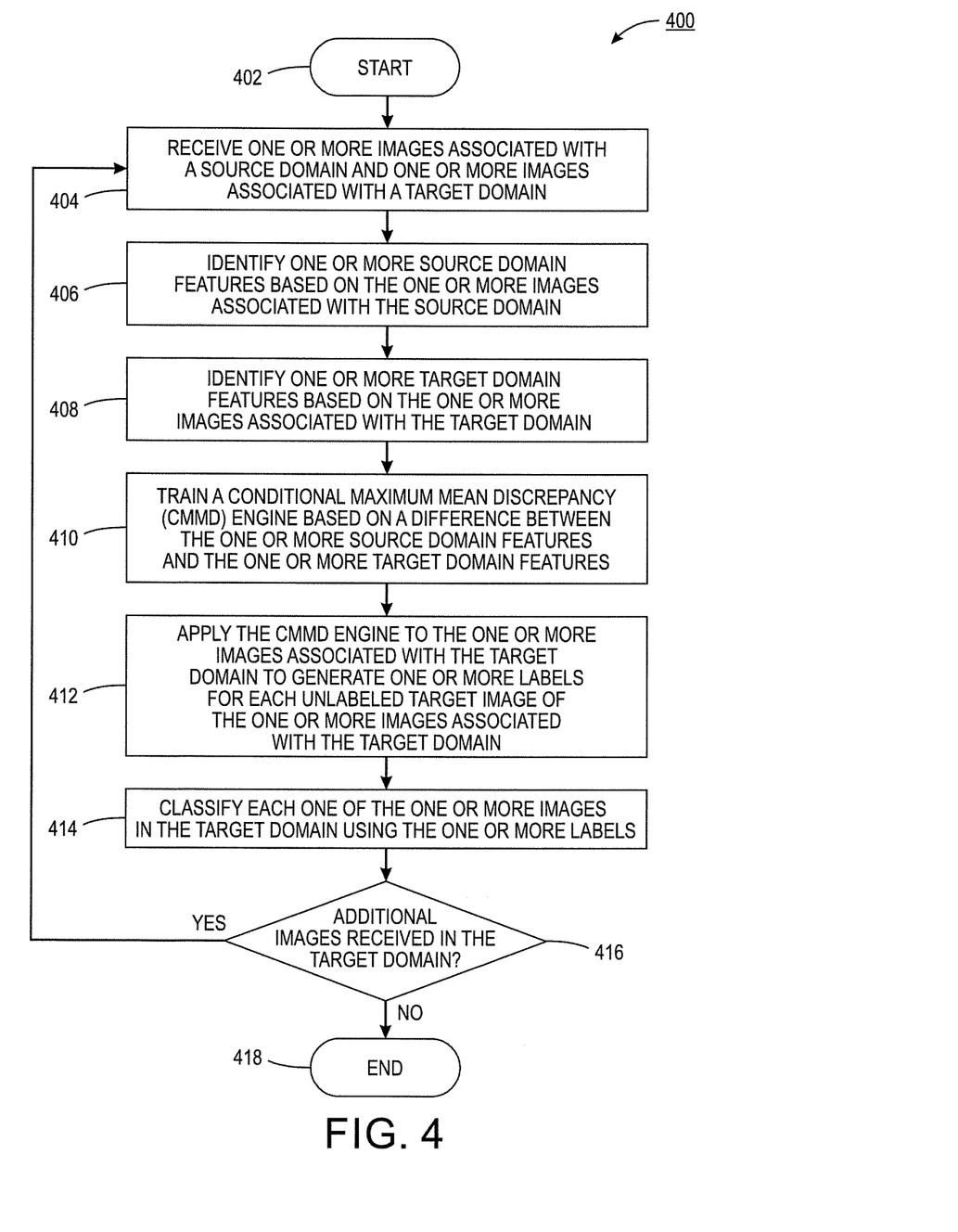
FIG. 4 illustrates a flowchart of an example method for classifying an image.
Figure 5:
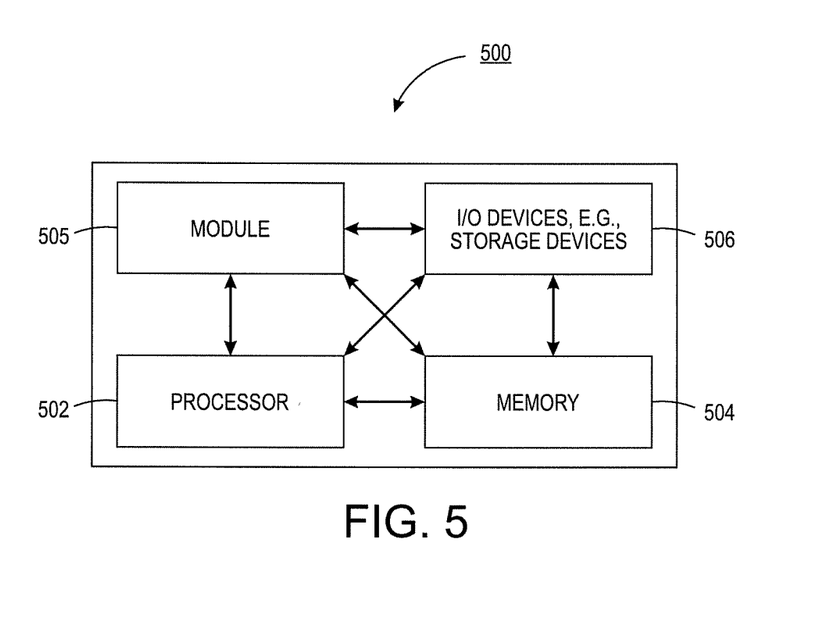
FIG. 5 illustrates an example high-level block diagram of a computer suitable for use in performing the functions described herein.

FIG. 4 illustrates a flowchart of an example method 400 for classifying an image. In one embodiment, one or more steps or operations of the method 400 may be performed by a processor of the BPAS 104 illustrated in FIG. 1 or a computer as illustrated in FIG. 5 and discussed below.

At block 402, the method 400 begins. At block 404, the method 400 receives one or more images associated with a source domain and one or more images associated with a target domain. For example an ICS may have been original trained with the one or more images associated with the source domain in the source domain. At a later time, the ICS may be redeployed to the target domain to classify images captured and received in the target domain.

At block 406, the method 400 identifies one or more source domain features based on the one or more images associated with the source domain. In one embodiment, the source domain features may be identified based on previously stored source domain features identified during training of the ICS in the source domain. In another embodiment, one or more deep neural networks of a CAN may be used to identify the source domain features.

At block 408, the method 400 identifies one or more target domain features based on the one or more images associated with the target domain. In one embodiment, one or more deep neural networks of a CAN may be used to identify the source domain features.

At block 410, the method 400 trains a conditional maximum mean discrepancy (CMMD) engine based on a difference between the one or more source domain features and the one or more target domain features. For example, the CAN deployed within a remotely located AS, or locally in the ICS, may calculate a difference or a shift between the source domain features and the target domain features. In one embodiment, the Equations (1) and (2) described above may be used by the CMMD engine to calculate the difference between the source domain features and the target domain features.

At block 412, the method 400 applies the CMMD engine to the one or more images associated with the target domain to generate one or more labels for each unlabeled target image of the one or more images associated with the target domain. For example, the CMMD engine may generate one or more labels in the target domain based on the differences of the source domain features and the target domain features. The labels may be used to label images that are unlabeled in the target domain.

At block 414, the method 400 classifies each one of the one or more images in the target domain using the one or more labels. Once the images are labeled, the CAN may then classify the images. For example, in a occupancy detector system for tolls or HOV lanes, the labels on the images from the target domain may allow the CAN to classify each image with a number of occupants in a vehicle.

Notably, the method 400 may use the CAN to classify images in a target domain without having to re-train the CAN. For example, the operation of the CMMD engine may allow the CAN to leverage features and labels identified during training in the source domain to identify features and generate labels for images in the target domain without training. The labels may then be applied to the images in the target domain to classify the images.

At block 416, the method 400 determines if additional images are received in the target domain. For example, the method 400 may be an iterative process that continues to re-use the features and labels to create the subsequent features and labels. With each subsequent iteration, the features and labels may be more specific and allow the CAN to provide more accurate classifications.

If the answer to block 416 is yes, the method 400 may return to block 404. Blocks 404-416 may then be repeated. If the answer to block 416 is no, then the method 400 may proceed to block 418. At block 418, the method 400 ends.

It should be noted that although not explicitly specified, one or more steps, functions, or operations of the method 400 described above may include a storing, displaying and/or outputting step as required for a particular application. In other words, any data, records, fields, and/or intermediate results discussed in the methods can be stored, displayed, and/or outputted to another device as required for a particular application. Furthermore, steps, blocks or operations in FIG. 4 that recite a determining operation or involve a decision do not necessarily require that both branches of the determining operation be practiced. In other words, one of the branches of the determining operation can be deemed as an optional step. In addition, one or more steps, blocks, functions or operations of the above described method 400 may comprise optional steps, or can be combined, separated, and/or performed in a different order from that described above, without departing from the example embodiments of the present disclosure.

FIG. 5 depicts a high-level block diagram of a computer that is dedicated to perform the functions described herein. As depicted in FIG. 5, the computer 500 comprises one or more hardware processor elements 502 (e.g., a central processing unit (CPU), a microprocessor, or a multi-core processor), a memory 504, e.g., random access memory (RAM) and/or read only memory (ROM), a module 505 for classifying an image, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s)

as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for classifying an image (e.g., a software program comprising computer-executable instructions) can be loaded into memory 504 and executed by hardware processor element 502 to implement the steps, functions or operations as discussed above in connection with the example method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for classifying an image (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for classifying an image, comprising:
   receiving, by a processor, one or more images associated with a source domain and one or more images associated with a target domain;
   identifying, by the processor, a plurality of source layers, wherein each one of the plurality of source layers comprises one or more source domain features based on the one or more images associated with the source domain via a plurality of deep neural networks;
   identifying, by the processor, a plurality of domain layers, wherein each one of the plurality of domain layers comprises one or more target domain features based on the one or more images associated with the target domain via the plurality of deep neural networks;
   training, by the processor, a plurality of conditional maximum mean discrepancy (CMMD) engines based on a difference between the one or more source domain features and the one or more target domain features, wherein each one of the plurality of CMMD engines receives the one or more source domain features from a respective source layer of the plurality of source layers and the one or more target domain features from a respective domain layer of the plurality of domain layers, wherein a number of the plurality of CMMD engines is equal to a number of the plurality of deep neural networks;
   applying, by the processor, the plurality of CMMD engines to the one or more images associated with the target domain to generate one or more labels for each unlabeled target image of the one or more images associated with the target domain; and
   classifying, by the processor, each one of the one or more images in the target domain using the one or more labels.

2. The method of claim 1, wherein the plurality of CMMD engines is optimized by a gradient descent algorithm.

3. The method of claim 1, wherein the image comprises text.

4. A non-transitory computer-readable medium storing a plurality of instructions, which when executed by a processor, causes the processor to perform operations for classifying an image comprising:
   receiving one or more images associated with a source domain and one or more images associated with a target domain;
   identifying a plurality of source layers, wherein each one of the plurality of source layers comprises one or more source domain features based on the one or more images associated with the source domain via a plurality of deep neural networks;
   identifying a plurality of domain layers, wherein each one of the plurality of domain layers comprises one or more target domain features based on the one or more images associated with the target domain via the plurality of deep neural networks;
   training a plurality of conditional maximum mean discrepancy (CMMD) engines based on a difference between the one or more source domain features and the one or more target domain features, wherein each one of the plurality of CMMD engines receives the one or more source domain features from a respective source layer of the plurality of source layers and the one or more target domain features from a respective domain layer of the plurality of domain layers, wherein a number of the plurality of CMMD engines is equal to a number of the plurality of deep neural networks;
   applying the plurality of CMMD engines to the one or more images associated with the target domain to generate one or more labels for each unlabeled target image of the one or more images associated with the target domain; and
   classifying each one of the one or more images in the target domain using the one or more labels.

5. The non-transitory computer-readable medium of claim 4, wherein the plurality of CMMD engines is optimized by a gradient descent algorithm.

6. The non-transitory computer-readable medium of claim 4, wherein the image comprises text.

7. A method for classifying an image, comprising:
receiving, by a processor of an image classification system, one or more images associated with a source domain where the image classification system was previously deployed and trained and one or more images associated with a target domain where the image classification system is re-deployed;
obtaining, by the processor, one or more source domain features from the one or more images associated with the source domain based on the image classification system that was previously deployed and trained, wherein the one or more source domain features are identified in a plurality of source layers by a plurality of deep neural networks;
identifying, by the processor, a plurality of domain layers, wherein each one of the plurality of domain layers comprises one or more target domain features based on the one or more images associated with the target domain via the plurality of deep neural networks;
training, by the processor, a plurality of conditional maximum mean discrepancy (CMMD) engines based on a shift between the one or more source domain features and the one or more target domain features, wherein each one of the plurality of CMMD engines receives the one or more source domain features from a respective source layer of the plurality of source layers and the one or more target domain features from a respective domain layer of the plurality of domain layers, wherein a number of the plurality of CMMD engines is equal to a number of the plurality of deep neural networks;
applying, by the processor, the plurality of CMMD engines to the one or more images associated with the target domain to generate one or more labels for each unlabeled target image of the one or more images associated with the target domain; and
classifying, by the processor, each one of the one or more images in the target domain using the one or more labels.

* * * * *